Patented Feb. 20, 1923.

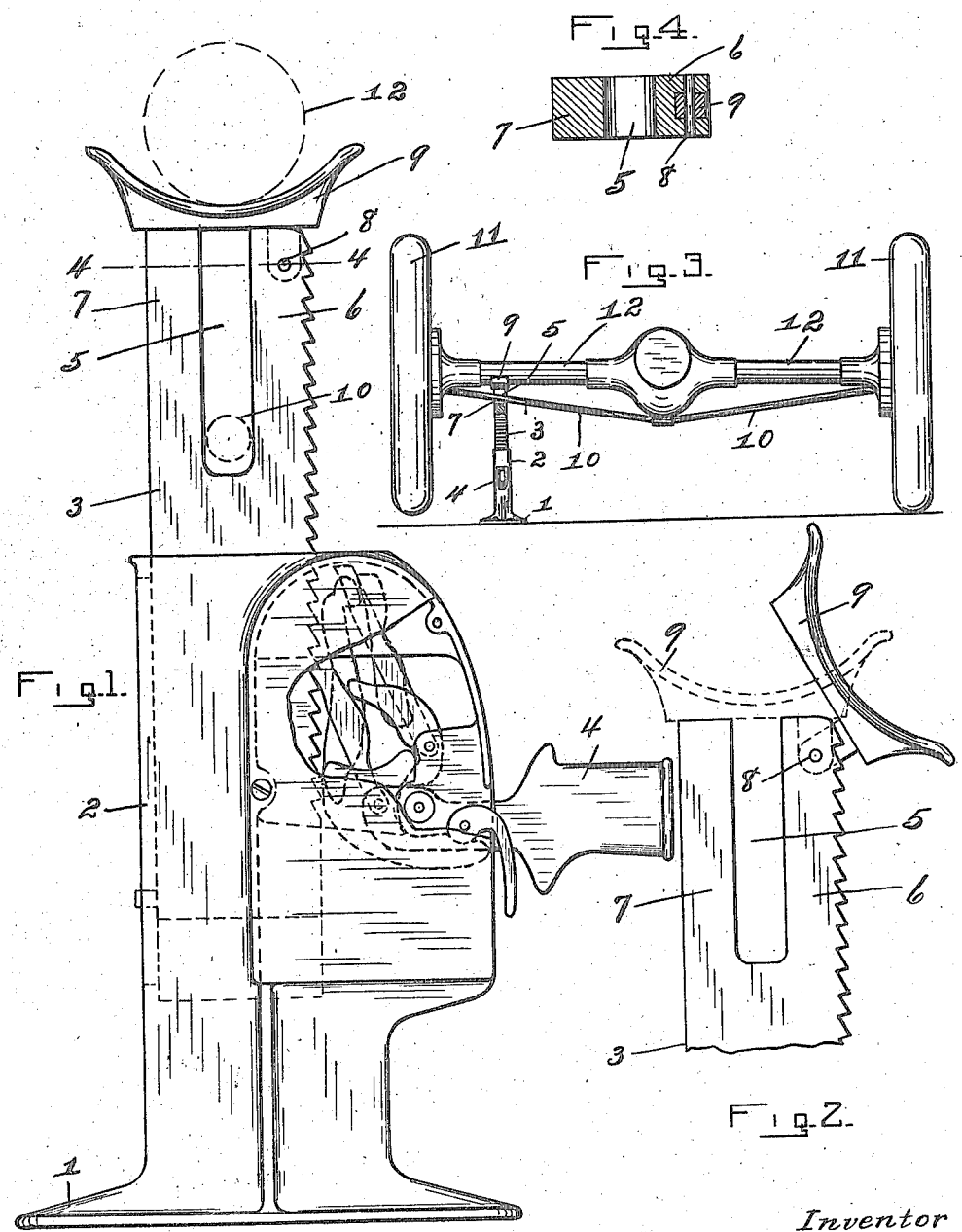

1,445,682

UNITED STATES PATENT OFFICE.

FREDERICK C. HILLER, OF TROY, NEW YORK.

AUTOMOBILE JACK.

Application filed April 3, 1922. Serial No. 548,949.

*To all whom it may concern:*

Be it known that I, FREDERICK C. HILLER, a citizen of the United States, residing at Troy, in the county of Rensselaer and State of New York, have invented new and useful Improvements in Automobile Jacks, of which the following is a specification.

Reference may be had to the accompanying drawings, and the reference characters marked thereon, which form a part of this specification. Similar characters refer to similar parts in the several figures therein.

In the use of lifting jacks and particularly automobile jacks it frequently happens that the most convenient point at which to locate the jack is beneath a truss-rod or some weak part of the vehicle which extends directly beneath an axle-housing or very strong part of the vehicle.

Such is frequently the case when it is desired to elevate one of the rear corners of an automobile, in which is usually found a truss-rod directly beneath the rear-axle-housing.

The principal object of the present invention is to apply a lifting jack to a rear-axle-housing or the like without interfering with a truss-rod or the like which may be directly beneath the housing.

Other objects will appear in connection with the following description.

I have ascertained that the stated object can be accomplished by providing the lifting-post of the jack with a slot in its upper end adapted to receive a truss-rod or the like, and covering this slot with a head adapted to engage the overlying axle-housing.

Fig. 1 of the drawings is a view in side elevation partly broken away showing a lifting-jack, embodying my invention.

Fig. 2 is a view of a broken-away upper end portion of the lifting-post with the removable head.

Fig. 3 is a rear view of the rear end of an automobile chassis showing the jack partly broken away, and applied to the rear-axle-housing without interference with the neighboring truss-rod.

Fig. 4 is a horizontal cross-section taken through the upper end of the slotted lifting-post through the hinge of the movable head.

Referring to the drawings wherein the invention is shown in preferred form, 1 is the base, 2 the casing, and 3 the lifting post of an automobile jack.

The post, 3, is adapted to be raised and lowered by a step-by-step movement by means of pawl-and-ratchet mechanism actuated by a socket handle, 4, in the usual manner.

The details of this pawl-and-ratchet mechanism are immaterial so far as the present invention is concerned, it being necessary to understand merely that the post, 3, can be gradually raised or lowered.

The post, 3, is provided in its upper end with a slot, 5, whereby the upper end of the post is divided into two members, 6 and 7. Upon the member, 6, which is shown as the toothed member of the ratchet-mechanism is pivotally mounted or hinged at 8, a removable head, 9, which can be swung from a position resting upon the post member, 7, as shown in Fig. 1 and indicated by dotted lines in Fig. 2, to a position shown by solid lines in Fig. 2, in which latter position the slot, 5, is uncovered and is free to receive a truss-rod, 10, or the like without interference with the upward or downward movement of the post, 3.

In Fig. 3, I have shown the rear end of an automobile chassis having wheels, 11, a rear-axle-housing, 12, and a truss-rod, 10.

In operating the jack to lift one corner of the rear end of an automobile as shown, the head, 9, is swung back to the position shown by solid lines in Fig. 2, and the jack is placed with the slot, 5, directly beneath the truss-rod, 10.

The head, 9, is then swung down to the position shown by solid lines in Fig. 1, closing the slot, 5, and causing the head to rest upon the post member, 7, which with the post-member, 6, tends to support the head.

The head, 9, being thus located beneath the rear axle housing, 12, the jack is operated in the usual manner causing the head to engage the rear-axle-housing, 12, while the truss-rod, 10, is free to play within the slot, 5.

The upward thrust of the jack is thus exerted directly upon the rear-axle-housing and not upon the truss-rod.

In removing the jack, the post, 3, is lowered until the head, 9, is free from the rear-axle-housing, 12, whereupon the head is swung back to the position shown by solid lines in Fig. 2, and the jack readily removed.

I have shown as a preferred form of my invention the head, 9, hinged to one member of the post, 3, by means of a horizontal or pivotal connection, 8; but for certain purposes of the invention it is immaterial in what manner the head is hinged to the post, 2, or whether it is hinged to the post or otherwise removably mounted upon the post.

What I claim as new and desire to secure by Letters Patent is—

1. A jack having a lifting-post provided with an opening in its upper end, and a removable head on said post extending over said opening.

2. A jack having a lifting-post provided with a slot in its upper end, and a head hinged to said post movable to and from a position to cover said slot.

3. A jack having a lifting-post provided with a slot in its upper end, and a head pivotally connected with one of the post-members, and oscillatory to and from a position to rest upon the other post-member.

In testimony wherof, I have hereunto set my hand this 28th day of March, 1922.

FREDERICK C. HILLER.